United States Patent
Dondi

(10) Patent No.: US 7,066,028 B2
(45) Date of Patent: Jun. 27, 2006

(54) ACOUSTIC SENSOR FOR MONITORING MACHINING PROCESSES IN MACHINING TOOLS

(75) Inventor: Valerio Dondi, Castel Maggiore Bo (IT)

(73) Assignee: Marposs Societa' per Azioni, Bentivoglio (IT)

( * ) Notice: Subject to any disclaimer, the term of this patent is extended or adjusted under 35 U.S.C. 154(b) by 0 days.

(21) Appl. No.: 10/503,821

(22) PCT Filed: Jan. 21, 2003

(86) PCT No.: PCT/EP03/00527

§ 371 (c)(1),
(2), (4) Date: Aug. 6, 2004

(87) PCT Pub. No.: WO03/073051

PCT Pub. Date: Sep. 4, 2003

(65) Prior Publication Data

US 2005/0210986 A1    Sep. 29, 2005

(30) Foreign Application Priority Data

Feb. 28, 2002  (IT) ............................ BO2002A0098

(51) Int. Cl.
*G01N 29/00* (2006.01)

(52) U.S. Cl. .............................. 73/649; 73/644; 73/660

(58) Field of Classification Search .................. 73/649, 73/660, 587, 1.82, 1.84, 650, 632, 633, 651, 73/644

See application file for complete search history.

(56) References Cited

U.S. PATENT DOCUMENTS

| | | | |
|---|---|---|---|
| 3,761,789 A * | 9/1973 | Krafft et al. ................. 388/819 |
| 4,397,188 A * | 8/1983 | Bansevichus et al. ......... 73/651 |
| 5,663,504 A | 9/1997 | Kluft |
| 5,688,160 A | 11/1997 | Pozzetti et al. |
| 6,127,770 A | 10/2000 | Hauser et al. |
| 6,848,315 B1 * | 2/2005 | Matsuki et al. ................ 73/651 |
| 6,888,288 B1 * | 5/2005 | Seki et al. ............. 310/323.16 |
| 2001/0020384 A1 | 9/2001 | Mueller et al. |
| 2004/0153285 A1 * | 8/2004 | Dondi ........................ 702/182 |

FOREIGN PATENT DOCUMENTS

| DE | 2193126 A * | 3/1988 |
|---|---|---|
| DE | DE 196 02 048 | 7/1997 |
| EP | 0 446 849 A2 | 9/1991 |
| GB | 2 170 008 | 7/1986 |
| WO | WO 03/006204 | 1/2003 |

\* cited by examiner

*Primary Examiner*—Hezron Williams
*Assistant Examiner*—Jacques Saint-Surin
(74) *Attorney, Agent, or Firm*—Dickstein Shapiro Morin & Oshinksy LLP

(57) ABSTRACT

An acoustic sensor for monitoring machining processes in machining tools, e.g. grinding machines, includes a stationary unit, or stator (21) and a rotating unit, or rotor (23), the latter being coupled, for instance, to the grinding wheel and rotating with it. The rotor includes a support (45;45') and a piezoelectric transducer (33). The position of the transducer is defined and locked without using glues by means of mechanical elements (48, 53, 54; 63, 64; 74, 78) that may include elastic elements such as springs. The rotor also includes a printed circuit board (55), connected to the piezoelectric transducer, with a charge amplifier (37) for amplifying the output signal of the piezoelectric transducer. The rotor is electrically coupled to the stator by means of transformer type couplings (30, 31).

23 Claims, 3 Drawing Sheets

ACOUSTIC SENSOR FOR MONITORING MACHINING PROCESSES IN MACHINING TOOLS

TECHNICAL FIELD

The present invention relates to an acoustic sensor including a stationary unit, a rotating unit with support and protection elements with a support, a vibration detecting transducer coupled to the support, positioning and clamping elements adapted to define and lock the position of the transducer, and power supply, processing and transmission circuits with at least one contactless coupling adapted for achieving the electric connection between the stationary unit and the rotating unit.

BACKGROUND ART

Acoustic sensors are known and used, for example, in apparatuses for monitoring the machining process of computer numerical control ("CNC") machine tools, as lathes, grinding machines, milling machines, etc. such apparatuses are able to detect, by means of sensors, the magnitude of physical features connected to the process to be checked, for example the wear of the tool, and indicate to the machine numerical control, or directly to the operator, the need to perform maintenance and/or corrective procedures.

An apparatus of this kind is disclosed in International patent application No. PCT/EP02/07519, filed by the same applicants of the present patent application.

In machining process monitorings on grinding machines, the acoustic sensors are generally coupled to the flange for securing to the spindle the grinding wheel (as shown in simplified form in FIG. 2) or the dressing wheel and enable to detect vibrations generated by the occurrence of contact between the grinding wheel (or the dressing wheel) and the workpiece (or the grinding wheel), in the course of the machining.

More specifically, the acoustic sensors presently utilized in apparatuses of the type described in the formerly mentioned patent application include a rotor with a casing coupled to a movable part as, for example, the grinding wheel of a grinding machine. Furthermore, the rotor includes a piezoelectric transducer glued to the casing and electric circuits for conditioning the output signal of the piezoelectric transducer. The rotor is coupled, by means of a transformer type coupling, to a stator connected, for example, to the bed of the grinding machine, that includes further electric circuits for processing and transmitting the signal received from the electric circuits of the rotor.

An acoustic sensor of this type is disclosed in European patent application EP-A-0446849.

The structure and the dimensions of the components of an acoustic sensor as the one disclosed in the formerly mentioned European patent application, provide good standards of performance in response to acoustic signals with frequencies reaching up to a few hundreds of KHz.

In a grinding machine in which it is desired to reach high rotation speeds, the grinding wheel (and/or the dressing wheel) is coupled to an electrospindle. The use of high speed electrospindles generates an acoustic background noise that, in the frequency range utilized by the known acoustic sensors (50–250 KHz), is added to the acoustic signal generated by the occurrence of contact between the grinding wheel and the workpiece or the dressing wheel thus making the detecting of said contact extremely difficult. In the graph of FIG. 1 there are shown, in logarithmic scale and as a function of frequency F, the trends of the spectral densities DS1 and DS2 of the background noise generated, in a grinding machine, by a traditional type spindle and by a high speed electrospindle, respectively, carrying the grinding wheel or the dressing wheel.

Furthermore, the dashed line in FIG. 1 indicates the trend of the spectral density DS3 of the acoustic signal generated by contact occurring between grinding wheel and workpiece or dressing wheel (that is the signal to be detected), that does not depend on the type of operation of the grinding wheel and, within certain limits, on the rotation speed of the grinding wheel itself. The graph of FIG. 1 shows how, at high speed (DS2), the ratio between the signal generated by the occurrence of contact between grinding wheel and workpiece and background noise is critical in the range of frequencies 50–250 KHz. As a consequence, the checking of the machining process, performed by an acoustic sensor operating in said range of frequencies, is extremely problematic. The ratio between useful signal and background noise is acceptable at higher frequencies (in the range 500 KHz–1 MHz). Thus, in order to perform machining process checkings on grinding machines with a grinding wheel rotating at high speed, activated by an electrospindle, the acoustic sensors like the one disclosed in patent application No. EP-A-0446849 have poor performances in consideration of the limited range of frequencies within which there is guaranteed good response.

DISCLOSURE OF INVENTION

An object of the present invention is to provide a broad band acoustic sensor that can transduce high-frequency acoustic signals in order to overcome the previously mentioned problems.

This and other objects are achieved by an acoustic sensor according to claim 1.

BRIEF DESCRIPTION OF THE DRAWINGS

The invention is hereinafter described with reference to the annexed drawings, given by way of non-limiting example only, wherein.

BEST MODE FOR CARRYING OUT THE INVENTION

Figure 1:
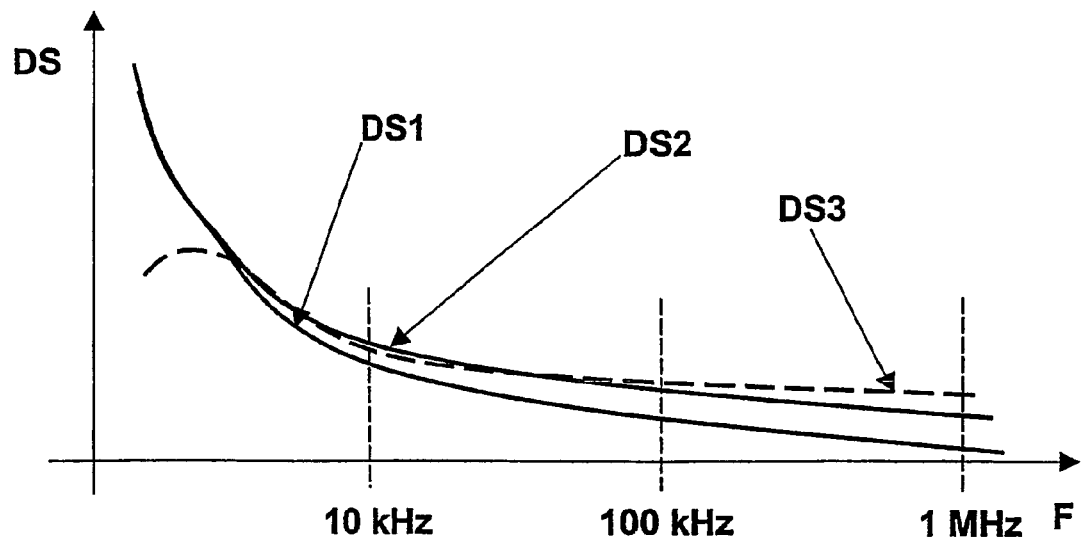
FIG. 1 is a graph representing the trends, as a function of frequency, of the spectral density of some signals.
Figure 2:
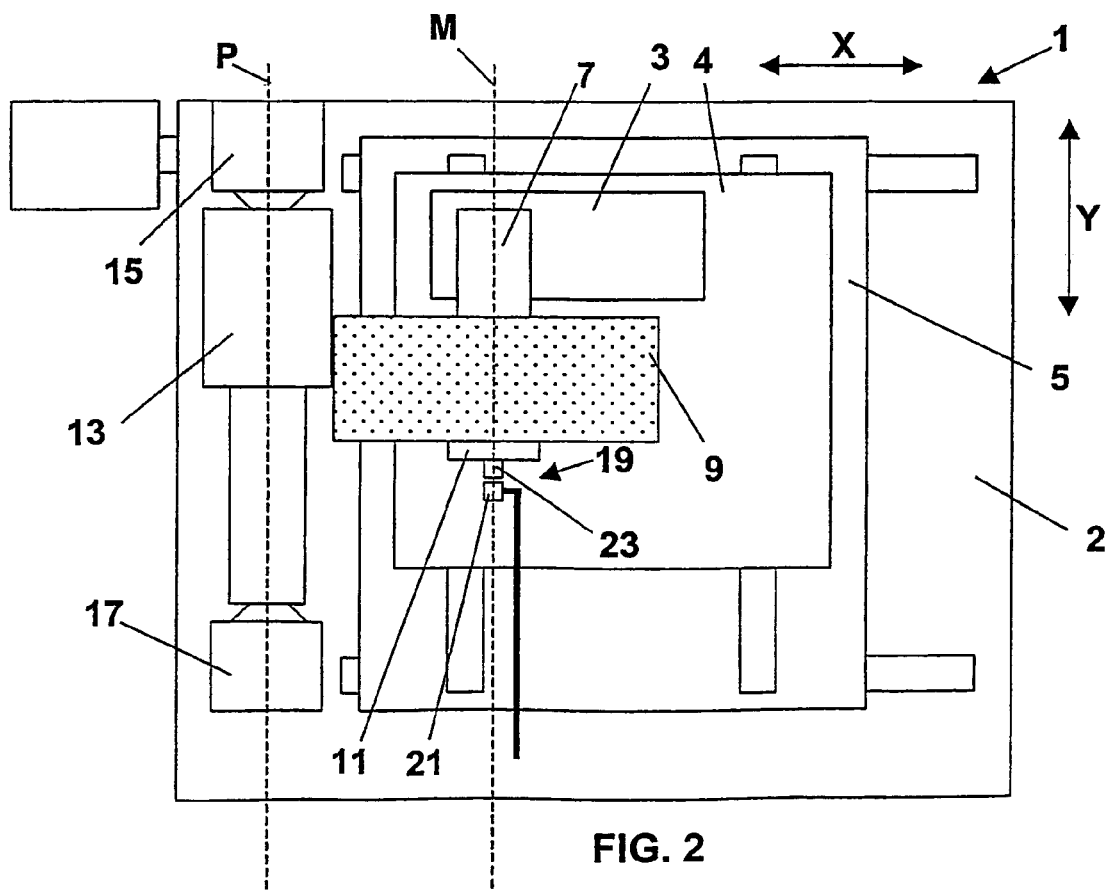
FIG. 2 is a plan view of a grinding machine, including an acoustic sensor according to the invention.

FIG. 2 is an extremely simplified and partial plan view of a machine tool, more specifically a computer numerical control ("CNC") grinding machine 1 including a bed 2, a tool-carrier 3, more specifically a wheel-carrier, coupled to a slide 4, that can displace relative to bed 2 along an axis Y and is, on its turn, coupled to a slide 5 that can displace relative to bed 2 along an axis X, in such a way that the tool-carrier 3 can perform movements in plane XY relative to bed 2. A spindle, for instance an electrospindle 7, is carried by the tool-carrier 3 and a grinding wheel 9 is coupled, by means of a flange 11, to the electrospindle 7. The electrospindle 7 causes the grinding wheel 9 to rotate about a longitudinal axis M.

The grinding machine 1 is utilized for the machining of a mechanical piece 13, with rotational symmetry, for example a shaft, supported, referenced and made to rotate about a longitudinal axis P, parallel to the longitudinal axis M, by means of a support and reference system of the known type that consists, for example, of a live center 15 and a dead center 17.

Figure 4:
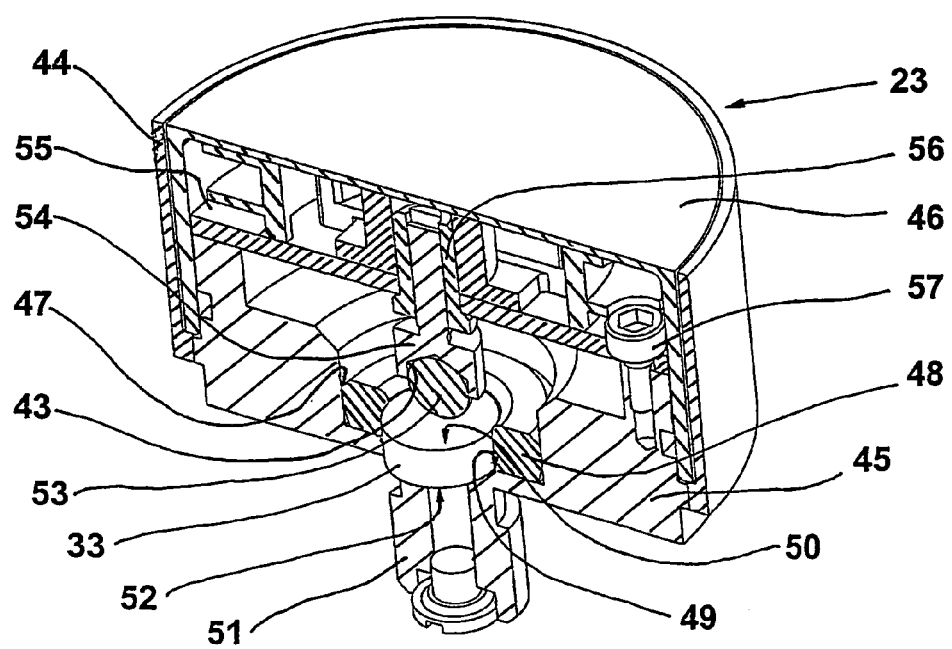
FIG. 4 is an axonometric, longitudinal cross-sectional view with some elements not sectioned, of the rotor of an acoustic sensor according to a first preferred embodiment of the invention.

The grinding machine includes an apparatus for checking the machining process by means of an acoustic sensor (or AE sensor) 19, illustrated in more detail in FIG. 4, including a stationary unit 21 (or stator) and a movable, rotating unit 23 (or rotor). The stator 21 is coupled to the bed 2, in a known and herein not shown way, while rotor 23 is coupled to flange 11 for the coupling of the grinding wheel 9 to the electrospindle 7.

Figure 3:
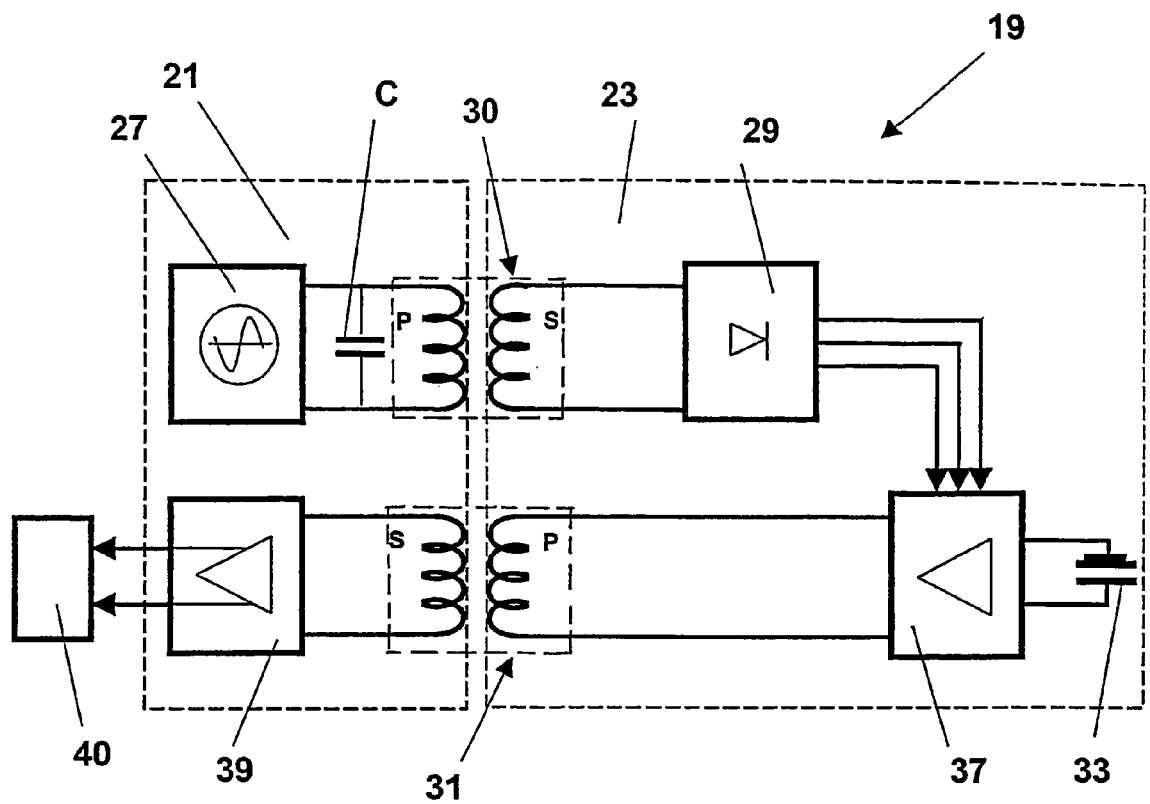
FIG. 3 is a circuit diagram of an acoustic sensor according to the invention.

FIG. 3 is an elementary circuit diagram of the acoustic sensor 19.

The acoustic sensor 19 includes power-supply, processing and transmission circuits with a sinusoidal voltage generator 27 in stator 21, power-supply circuits with a rectifier 29 in rotor 23, and a first contactless coupling, more specifically a transformer type inductive coupling 30, for the electric connection between generator 27 and rectifier 29. A vibration detecting transducer, more specifically a piezoelectric transducer 33, is located in rotor 23, the latter also houses a first amplifier, or charge amplifier 37 that receives the signal output by the piezoelectric transducer 33, and is power supplied by rectifier 29. The charge amplifier 37 is connected—by means of a second contactless coupling, more specifically a transformer type inductive coupling 31—to a second amplifier, or line amplifier 39, in stationary unit 21, the latter amplifier being in turn connected to a processing and display unit 40, external to sensor 19, for the processing and the displaying of the signal.

The acoustic sensor 19 operates in the following way. When a vibration is generated, for example, by the occurrence of contact between grinding wheel 9 and piece 13, the piezoelectric transducer 33 emits an electric signal that is sent to the amplifier 37, amplified by the latter and sent, by means of the transformer type coupling 31, to the line amplifier 39 that amplifies and transmits it, on an adapted line, to the processing and display unit 40. Amplifier 37 is power supplied by the sinusoidal voltage generator 27 through the rectifier 29 that is connected, by means of the transformer type coupling 30, to the voltage generator 27.

FIG. 4 is an axonometric, cross-sectional view of rotor 23 of the acoustic sensor 19 according to a first embodiment of the invention. Rotor 23 includes support and protection elements with a support 45, for example made from steel, defining a seat 47, and positioning and clamping elements with an annular centering element 48, for example made from plastic material like PVC. The positioning and clamping elements include also mechanical clamping devices with a thrust device having an elongate element 54 and a ball 53, made from conductive material, welded in a seat 43 defined by the elongate element 54. The elongate element 54 is in turn coupled, by means of an adjustable threaded coupling, to a bushing 56, integral to the support and protection elements of the rotor 23.

The piezoelectric transducer 33 has a cylindrical shape with two plane faces, and is arranged in a hole defined by the annular element 48, that determines the transversal position of the transducer 33 within seat 47.

The ball 53 defines an abutment surface that operates on the piezoelectric transducer 33 by urging and locking it against a surface 49 of the support 45, with a force that can be set thanks to the threaded coupling between the elongate element 54 and the bushing 56. Moreover, the support 45, the elongate element 54 and the ball 53 have the function of electrically connecting the electrodes 50, 52 of the transducer (that coincide with the plane faces of the piezoelectric transducer 33) and a printed circuit board 55 that carries the bushing 56 and includes the rectifier 29 and the charge amplifier 37. More specifically, the lower electrode 52 is connected to the printed circuit board 55 by means of the surface 49 of the support 45 and three screws 57 set 120° apart, only one shown in FIG. 4, that also serve to secure the printed circuit board 55 to the support 45. The upper electrode 50 is electrically connected to the printed circuit board 55 by means of the ball 53 and the elongate element 54 that is in contact, by means of the bushing 56, with a conductive portion on printed circuit board 55. Moreover, the printed circuit board 55 includes the secondary winding of the transformer type coupling 30 and the primary winding of the transformer type coupling 31. The support 45 includes a threaded spigot 51 for securing rotor 23 to flange 11, in a known way. The support and protection elements include also a first, substantially cylindrical-shaped, casing 46, sealed at an end and made, for example, from plastic material and a second, substantially cylindrical-shaped, casing 44 made, for example, from steel. The manufacture of the first casing 46 from plastic material enables the electromagnetic coupling between the windings of rotor 23 and stator 21.

An important characteristic that an acoustic sensor 19 according to the invention provides is that of detecting and transducing high frequency acoustic signals. This is achieved thanks to a piezoelectric transducer 33 with small dimensions and, consequently, high resonance frequency. The direct connection of the piezoelectric transducer 33 to the charge amplifier 37, in other words the amplification of the output signal of the piezoelectric transducer 33, enables to minimize the influence of parasitic electric parameters that could lower the sensitivity and the transducing frequency range. Moreover, the direct amplification of the transducer signal diminishes the influence of the electric noise generated by the subsequent processing circuits. More specifically, the transmission to the stator 21 of a signal having amplified amplitude and power improves the immunity of the whole acoustic sensor 19 from external electromagnetic interferences.

The glueless coupling of the transducer 33 to the support 45, achieved by means of a rigid mechanical coupling that, in the embodiment of FIG. 4, includes the ball 53 and the adjustable coupling between the elongate element 54 and the bushing 56, guarantees a low acoustic impedance between the piezoelectric transducer 33 and the support 45 and ensures a good response of the acoustic sensor to high frequencies. Furthermore, this mechanical coupling is advantageous over the known solutions that foresee the use of glues also because it gives the possibility of removing and substituting the transducer by performing simple operations, for example in the case of transducer failure. The use of the line amplifier 39, i.e. an amplifier with output impedance equal to the cable impedance, enables the analogic transmission of the signal to the processing and display unit 40 even when there are long connecting cables, without there being problems of attenuating the signal and limiting its frequency range. This is particularly advantageous when it is required that the connecting cables between acoustic sensor 19 and processing unit 40 be some tens of meters long, owing to the layout dimensions and the build of the grinding machines.

The amplifier 37 is power supplied by a voltage transmitted by stator 21 to rotor 23 by means of a transformer type coupling (30). In order to avoid the irradiation of electromagnetic fields, generated by this type of transmission of the signal, the frequency of the power supply sent to the primary winding of the transformer 30 is stabilized by a quartz oscillator 27. Furthermore, the emission of harmonics is furtherly reduced by a capacitor C that, connected in parallel to the primary of the transformer 30, achieves a circuit resonant at the same frequency as the quartz oscillator 27.

Variants with respect to what is herein described are feasible. In the event the space available on the grinding machine 1 does not permit the mounting of the stator 21 as shown in FIG. 2, it can be mounted on bed 2 of the grinding machine 1 at the end of the electrospindle 7 opposite the one carrying the grinding wheel 9. In this case, the rotor 23 is still coupled to the flange 11 for coupling the grinding wheel 9 to the electrospindle 7 but the windings of the transformer type couplings 30 and 31 integral to rotor 23 are coupled to the electrospindle 7 at the end opposite the one carrying the grinding wheel 9 and the stator 21 is arranged on slide 4 in a position that enables the electromagnetic coupling with the windings of rotor 23. The connection among these windings, rectifier 29 and amplifier 37 can be made by means of cables, through a hole traversing the electrospindle 7, or by means of a wireless connection, for example by means of optical signals, also transmitted through a hole in the electrospindle 7.

Acoustic sensors with other types of rigid mechanical coupling between the piezoelectric transducer 33 and the support 45 also fall within the scope of the present invention.

Figure 5:
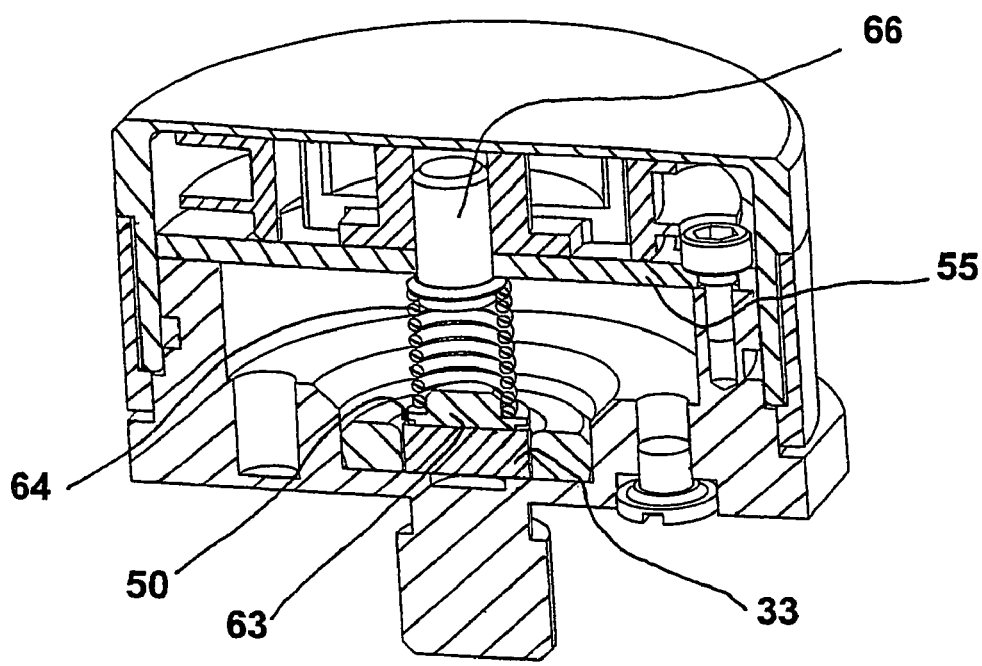
FIG. 5 is an axonometric, longitudinal cross-sectional view with some elements not sectioned, of the rotor of an acoustic sensor according to a second preferred embodiment of the invention.

For example, the thrust device can include, instead of ball 53, a per se known elastic element between the elongate element 54 and the electrode 50, like a "cup" spring. According to another possible embodiment, the elongate element 54 with the ball 53 are replaced with an elastic element like a spring that operates on the electrode 50—in a direct way or by means of an element for protecting the surface of the electrode itself—for urging and locking the transducer 33 against the surface 49 of the support 45. In this case the spring may achieve both the previously described rigid mechanical coupling and the electric connection between the electrode 50 and a suitable conductive portion on the printed circuit board 55. FIG. 5 shows an embodiment of the invention that includes these features, wherein the spring, identified by reference number 64, is arranged between the support and protection elements and the transducer 33. More specifically, the spring 64 is coupled on one side to a centering element 66, coupled to the printed circuit board 55, and on the other side to a conductive plate 63 abutting against the transducer 33. The conductive plate 63 has an annular plane surface in contact with the electrode 50, and this prevents the surface of the electrode 50 from deteriorating owing to the action of the spring 64.

Figure 6:
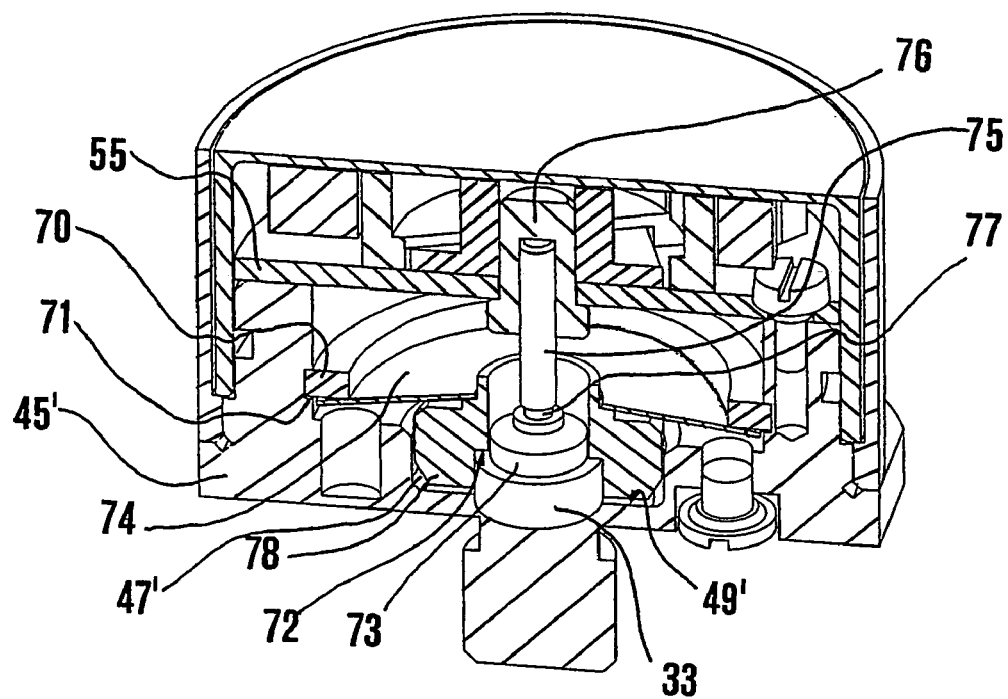
FIG. 6 is an axonometric, longitudinal cross-sectional view with some elements not sectioned, of the rotor of an acoustic sensor according to a third preferred embodiment of the invention.

Another possible embodiment is shown in FIG. 6, where the mechanical clamping devices still include an elastic element, in this case an annular leaf spring 74. A modified annular centering element 78 housed in seat 47' of support 45', defines a through hole—with two concentric portions of different diameters and an annular abutment surface 72—housing the piezoelectric transducer 33 and a conductive protection plate 73 similar to plate 63 of the embodiment of FIG. 5. An abutment ring 70 is partially housed in an annular seat 71 defined by an internal cylindrical surface of support 45', and the annular leaf spring 74 is arranged between the abutment ring 70 and the centering element 78 as shown in FIG. 6. More specifically, the outer and inner rims of the annular leaf spring 74 cooperate with the abutment ring 70 and the centering element 78, respectively, pushing the latter—and, through the annular abutment surface 72, the piezoelectric transducer 33—against the surface 49' of the support 45'.

In this case the leaf spring 74 achieves the rigid mechanical coupling between the transducer 33 and the support 45, but not any electric connection. An axially arranged bushing 75 is coupled to the printed circuit board 55 through a cap 76 (e.g. by means of welding) and houses and guides a movable rod 77, the latter having a protruding end in contact with protection plate 73. The bushing 75 also houses a spring (not shown in the figure) outwardly thrusting the rod 77 with a light force sufficient to keep the contact between rod 77 and plate 73 in order to perform and guarantee the electric connection between the electrode 50 and a suitable conductive portion of the printed circuit board 55.

The embodiment of FIG. 6 allows to safely lock in position the transducer 33 with a high force without applying an excessive thrust on possibly delicate parts of the support and protection elements, e.g. including the printed circuit board 55.

The invention claimed is:

1. An acoustic sensor including:
   a stationary unit,
   a rotating unit with
   support and protection elements with a support,
   a vibration detecting transducer coupled to the support, and
   positioning and clamping elements adapted to define and lock the position of the transducer against a surface of the support, and
   power supply, processing and transmission circuits with at least one contactless coupling adapted for achieving an electric connection between the stationary unit and the rotating unit, wherein said positioning and clamping elements include mechanical clamping devices adapted for achieving a rigid mechanical coupling between the transducer and said surface of the support.

2. The acoustic sensor according to claim 1, wherein said mechanical clamping devices include a thrust device coupled to the support and protection elements and defining an abutment surface, the thrust device being adapted for urging the transducer against said surface of the support.

3. The acoustic sensor according to claim 2, wherein said thrust device includes an elongate element coupled to the support and protection elements, said abutment surface being integral with the elongate element and in contact with the transducer.

4. The acoustic sensor according to claim 3, wherein said abutment surface has a substantially ball shape, and the elongate element is coupled in an adjustable way to the support and protection elements.

5. The acoustic sensor according to claim 2, wherein said thrust device includes an elastic element arranged between the support and protection elements and the transducer.

6. The acoustic sensor according to claim 5, wherein said elastic element is a leaf spring defining said abutment surface.

7. The acoustic sensor according to claim 6, wherein said leaf spring has an annular shape, the support and protection elements include an abutment ring fixedly coupled to the support and cooperating with a portion of the leaf spring.

8. The acoustic sensor according to claim 1, wherein the positioning and clamping elements include a centering element and the support defines a seat, the centering element and the transducer being housed in said seat.

9. The acoustic sensor according to claim 8, wherein the centering element has an annular shape and defines a hole, the transducer being arranged in said hole.

10. The acoustic sensor according to claim 7, wherein the positioning and clamping elements include a centering element having a substantially annular shape with a hole and an internal annular abutment surface, the transducer being arranged in said hole in contact with the annular abutment surface, and the support defines a seat, the centering element being housed in said seat, said abutment surface defined by the leaf spring cooperating with the centering element to urge the transducer against said surface of the support.

11. The acoustic sensor according to claim 10, wherein said abutment ring cooperates with the outer rim of the leaf spring, the inner rim of the leaf spring defining said abutment surface.

12. The acoustic sensor according to claim 2, wherein said vibration detecting transducer is a piezoelectric transducer.

13. The acoustic sensor according to claim 12, wherein the piezoelectric transducer has a substantially cylindrical shape defining two plane faces and includes two electrodes at said two plane faces.

14. The acoustic sensor according to claim 13, wherein one of said electrodes is in contact with said surface of the support.

15. The acoustic sensor according to claim 13, wherein one of said electrodes is in contact with a surface of the thrust device.

16. The acoustic sensor according to claim 1, wherein the support and protection elements of the rotating unit include a printed circuit board that defines part of said power supply, processing and transmission circuits, and is electrically connected to the transducer.

17. The acoustic sensor according to claim 16, wherein the thrust device is adapted for achieving the electric connection between the transducer and the printed circuit board.

18. The acoustic sensor according to claim 1, wherein the power supply, processing and transmission circuits include a voltage generator in the stationary unit, and power supply circuits in the rotating unit.

19. The acoustic sensor according to claim 18, wherein said at least one contactless coupling is adapted for electrically connecting the voltage generator to the power supply circuits, the sensor including a second contactless coupling for transmission of a signal of the transducer to the stationary unit.

20. The acoustic sensor according to claim 19, wherein the power supply, processing and transmission circuits include a first amplifier in the rotating unit coupled to the vibration detecting transducer and a second amplifier in the stationary unit, the second contactless coupling enabling an electric connection between said first amplifier and second amplifier.

21. The acoustic sensor according to claim 19, wherein said contactless couplings are transformer type inductive couplings.

22. An acoustic sensor including:
a stationary unit,
a rotating unit with support and protection elements with
  a support,
  a vibration detecting transducer coupled to the support,
  positioning and clamping elements adapted to define and lock the position of the transducer, including mechanical clamping devices rigidly coupling the transducer to the support without using glues, and
  power supply, processing and transmission circuits with at least one contactless coupling adapted for achieving an electric connection between the stationary unit and the rotating unit.

23. An acoustic sensor including:
a stationary unit,
a rotating unit with
  support and protection elements with a support,
  a vibration detecting transducer, adapted to transduce high frequency acoustic signals, coupled to the support, and
  positioning and clamping elements adapted to define and lock position of the transducer against a surface of the support, and
  power supply, processing and transmission circuits with at least one contactless coupling adapted for achieving the electric connection between the stationary unit and the rotating unit,
wherein said positioning and clamping elements include mechanical clamping devices with a thrust device coupled to the support and protection elements and defining an abutment surface, the thrust device being adapted for achieving a rigid mechanical coupling between the transducer and said surface of the support without causing any substantial deformation of the transducer.

* * * * *